US012600307B2

(12) United States Patent
Gudapati et al.

(10) Patent No.: US 12,600,307 B2
(45) Date of Patent: Apr. 14, 2026

(54) TECHNIQUES FOR REDUCING VEHICLE ENERGY CONSUMPTION WITH DYSFUNCTIONAL HARDWIRE WAKE-UPS

(71) Applicant: FCA US LLC, Auburn Hills, MI (US)

(72) Inventors: Abhilash Gudapati, Auburn Hills, MI (US); Rudolf Kharpuri, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/817,925

(22) Filed: Aug. 28, 2024

(65) Prior Publication Data

US 2026/0061951 A1     Mar. 5, 2026

(51) Int. Cl.
| | |
|---|---|
| *B60R 16/023* | (2006.01) |
| *B60L 1/00* | (2006.01) |
| *B60L 53/60* | (2019.01) |
| *B60L 58/10* | (2019.01) |
| *B60R 16/033* | (2006.01) |

(52) U.S. Cl.
CPC ............ *B60R 16/0232* (2013.01); *B60L 1/00* (2013.01); *B60L 53/60* (2019.02); *B60L 58/10* (2019.02); *B60R 16/033* (2013.01)

(58) Field of Classification Search
CPC ... B60R 16/0232; B60R 16/033; B60L 53/60; B60L 58/10; B60L 1/00
USPC .................................................. 307/9.1, 10.1
See application file for complete search history.

(56) References Cited

U.S. PATENT DOCUMENTS

| | | | |
|---|---|---|---|
| 10,871,749 B2 | 12/2020 | Jentz et al. | |
| 11,220,228 B2 | 1/2022 | AminiKashani et al. | |
| 11,524,693 B2 | 12/2022 | Nemeth et al. | |
| 2022/0001835 A1* | 1/2022 | Kim ....................... | B60R 25/00 |
| 2022/0402447 A1* | 12/2022 | Kwon ................ | B60W 50/045 |
| 2023/0304500 A1* | 9/2023 | Fleischmann ....... | F04D 15/0094 |
| 2024/0149695 A1* | 5/2024 | Chon ......................... | B60L 3/00 |
| 2025/0206191 A1* | 6/2025 | Golm ..................... | B60L 58/12 |

FOREIGN PATENT DOCUMENTS

| | | |
|---|---|---|
| CN | 101456391 A | 6/2009 |
| CN | 101456392 A | 6/2009 |
| CN | 101634853 A | 1/2010 |
| CN | 112644420 A | 4/2021 |
| JP | 2011111039 A | 6/2011 |

* cited by examiner

*Primary Examiner* — Michael R. Fin
(74) *Attorney, Agent, or Firm* — Jeremy J. Klobucar

(57) ABSTRACT

A hardwire wake-up line monitoring and power saving method for a vehicle includes a secondary controller providing a wake-up signal to a supervisory controller via a hardwire wake-up line connected therebetween and the supervisory controller waking up in response to receiving the wake-up signal via the hardwire wake-up line, executing a set of functions for the secondary controller associated with the wake-up signal, detecting a malfunction of the hardwire wake-up line when the set of functions are completed or expired and the hardwire wake-up line is still providing the wake-up signal, and in response to detecting the malfunction of the hardwire wake-up line, transitioning to a low power mode where outputs of the supervisory controller are temporarily disabled to save power and the supervisory controller continues to monitor for a valid wake-up request.

20 Claims, 4 Drawing Sheets

TECHNIQUES FOR REDUCING VEHICLE ENERGY CONSUMPTION WITH DYSFUNCTIONAL HARDWIRE WAKE-UPS

FIELD

The present application generally relates to vehicle control systems and, more particularly, to techniques for reducing vehicle energy consumption with dysfunctional hardwire wake-ups.

BACKGROUND

Today's vehicles have control systems that often include a plurality of controllers in communication via a controller area network (CAN). In many cases, at least one of these controllers has a hardwire wake-up line, which allows the respective controller to be woken up (from a powered-down or sleep state) without using CAN communication. A CAN-based wake-up of a controller, for example, could require all of the various controllers on a particular CAN bus being woken up. Hardwire wake-up lines also allows for controllers to be woken up when they are unable to be woken up via the CAN or to be woken up individually without waking up other controllers. In some cases, these hardwire wake-up lines could malfunction and be shorted to high (12V), which is also referred to as a dysfunctional wake-up. This could result in one or more controllers being inadvertently kept awake, thereby causing excessive low voltage battery drain. Accordingly, while such conventional vehicle control systems do work for their intended purpose, there exists an opportunity for improvement in the relevant art.

SUMMARY

According to one example aspect of the invention, a hardwire wake-up line monitoring and power saving system for a vehicle is presented. In one exemplary implementation, the system comprises a supervisory controller of the vehicle and a hardwire wake-up line connected to the supervisory controller and controlled by a secondary controller of the vehicle to selectively provide a wake-up signal to wake-up the supervisory controller, wherein the supervisory controller is configured to wake-up in response to waking up, execute a set of functions for the secondary controller, after completion of the set of functions, detect a malfunction of the hardwire wake-up line when the hardwire wake-up line is still providing the wake-up signal, and in response to detecting the malfunction of the hardwire wake-up line, transition to a low power mode where outputs of the supervisory controller are temporarily disabled to save power and the supervisory controller continues to monitor for a valid wake-up request.

In some implementations, the supervisory controller is configured to transition from the low power mode to a normal mode in response to receiving the valid wake-up request, and wherein the valid wake-up request is a wake-up signal received by the supervisory controller (i) via another hardwire wake-up line controlled by another secondary controller of the vehicle or (ii) via a controller area network (CAN) bus of the vehicle. In some implementations, the outputs of the supervisory controller that are temporarily disabled during the low power mode include outputs via controller area network (CAN) buses and local interconnect network (LIN) buses of the vehicle.

In some implementations, the vehicle is an electrified vehicle comprising a 12 Volt (12V) battery system, and wherein the malfunction of the hardwire wake-up line is caused by a short of the hardwire wake-up line to the 12V battery system. In some implementations, the secondary controller is a body control module (BCM) and the hardwire wake-up line is an ignition run line. In some implementations, the secondary controller is a charging control module (CCM) and the hardwire wake-up line is a plug-in status line. In some implementations, the secondary controller is a central body controller (CBC) and the hardwire wake-up line is a pulse-based wake-up line, and wherein the supervisory controller does not have the capability to wake-up on a controller area network (CAN) or a real-time clock (RTC).

In some implementations, the secondary controller is a battery pack control module (BPCM) for a high voltage battery system of the electrified vehicle and the supervisory controller does not participate in a set of condition or monitoring functions performed by the BPCM on the high voltage battery system. In some implementations, the secondary controller is a motor control processor (MCP) for an electric motor of the electrified vehicle and the hardware wakeup line is configured as a back electromotive force (EMF) based gate drive wakeup to inform the supervisory controller that high voltage is present on a high voltage bus or that the electrified vehicle is being flat towed. In some implementations, the secondary controller is a power panel control device for user control of a power generation mode where electrical energy is offloaded from the electrified vehicle and the hardwire wakeup line is directly connected to the power panel control device.

According to another example aspect of the invention, a hardwire wake-up line monitoring and power saving method for a vehicle is presented. In one exemplary implementation, the method comprises providing, by a secondary controller of the vehicle, a wake-up signal to a supervisory controller of the vehicle via a hardwire wake-up line connected therebetween, waking up, by the supervisory controller, in response to receiving the wake-up signal via the hardwire wake-up line, executing, by the supervisory controller, a set of functions for the secondary controller associated with the wake-up signal, detecting, by the supervisory controller, a malfunction of the hardwire wake-up line when the set of functions are completed or expired and the hardwire wake-up line is still providing the wake-up signal, and in response to detecting the malfunction of the hardwire wake-up line, transitioning, by the supervisory controller, to a low power mode where outputs of the supervisory controller are temporarily disabled to save power and the supervisory controller continues to monitor for a valid wake-up request.

In some implementations, the supervisory controller is configured to transition from the low power mode to a normal mode in response to receiving the valid wake-up request, and wherein the valid wake-up request is a wake-up signal received by the supervisory controller (i) via another hardwire wake-up line controlled by another secondary controller of the vehicle or (ii) via a controller area network (CAN) bus of the vehicle. In some implementations, the outputs of the supervisory controller that are temporarily disabled during the low power mode include outputs via controller area network (CAN) buses and local interconnect network (LIN) buses of the vehicle.

In some implementations, the vehicle is an electrified vehicle comprising a 12 Volt (12V) battery system, and wherein the malfunction of the hardwire wake-up line is caused by a short of the hardwire wake-up line to the 12V battery system. In some implementations, the secondary controller is a body control module (BCM) and the hardwire wake-up line is an ignition run line. In some implementations, the secondary controller is a charging control module (CCM) and the hardwire wake-up line is a plug-in status line. In some implementations, the secondary controller is a central body controller (CBC) and the hardwire wake-up line is a pulse-based wake-up line, and wherein the supervisory controller does not have the capability to wake-up on a controller area network (CAN) or a real-time clock (RTC).

In some implementations, the secondary controller is a battery pack control module (BPCM) for a high voltage battery system of the electrified vehicle and the supervisory controller does not participate in a set of condition or monitoring functions performed by the BPCM on the high voltage battery system. In some implementations, the secondary controller is a motor control processor (MCP) for an electric motor of the electrified vehicle and the hardwire wakeup line is configured as a back electromotive force (EMF) based gate drive wakeup to inform the supervisory controller that high voltage is present on a high voltage bus or that the electrified vehicle is being flat towed. In some implementations, the secondary controller is a power panel control device for user control of a power generation mode where electrical energy is offloaded from the electrified vehicle and the hardwire wakeup line is directly connected to the power panel control device.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, today's vehicles and, in particular, electrified vehicles (EVs) such as battery electric vehicles (BEVs), have control systems that include a plurality of controllers in communication via a controller area network (CAN). In many cases, at least one of these controllers has a hardwire wake-up line, which allows the respective controller to be woken up (from a powered-down or sleep state) without using CAN communication, which could require all of the various controllers on a particular CAN bus being woken up. This also allows for controllers to be woken up when they are unable to be woken up via the CAN or to be woken up individually without waking up other controllers. Non-limiting examples of controllers having hardwire wake-up lines include a supervisory controller, a charging controller, a body controller, a battery pack controller, a motor controller, and a power panel system (switches or a controller). In some cases, these hardwire wake-up lines could malfunction or otherwise be dysfunctional and thus could remain high/active even after the functions of the supervisory controller (i.e., the reason that it was woken up) have since expired. For example, one potential cause of this malfunction could be the hardwire wakeup line being electrically shorted to high (12V). This malfunctioning hardwire wake-up line could result in one or more controllers being inadvertently kept awake by the supervisory controller, thereby causing excessive low voltage battery drain.

Accordingly, improved hardwire wake-up line monitoring and power saving systems and methods for vehicles are presented herein. These systems and methods utilize a unique low-power mode where a supervisory controller is merely listening or monitoring for hardwire wake-ups and for other valid wake-ups (e.g., an ignition-on wake-up). In one example implementation, the period that a hardwire wake-up line remains high (12V) could be determined to exceed that which is expected based on voltage thresholds, related CAN or other network signals, and a status of functions, such as in-process or expired (e.g., everything else associated with the functions has been subsequently powered-down or asleep). It will be appreciated, however, that the exact technique utilized to determine whether a particular hardwire wake-up line is dysfunctional (e.g., shorted to high or 12V) could vary and there could also be multiple different techniques employed for a single vehicle application. The techniques of the present application are focused more specifically on the unique low-power mode and the actions taken by the supervisory controller to ignore the dysfunctional or malfunctioning hardwire wake-up line and thereby allow other vehicle controllers to remain asleep and thereby save low voltage (12V) battery power. The supervisory controller could also, for example, disable its outputs, such as communication buses (CAN buses, local interconnect network, or LIN buses, etc.).

Figure 1:
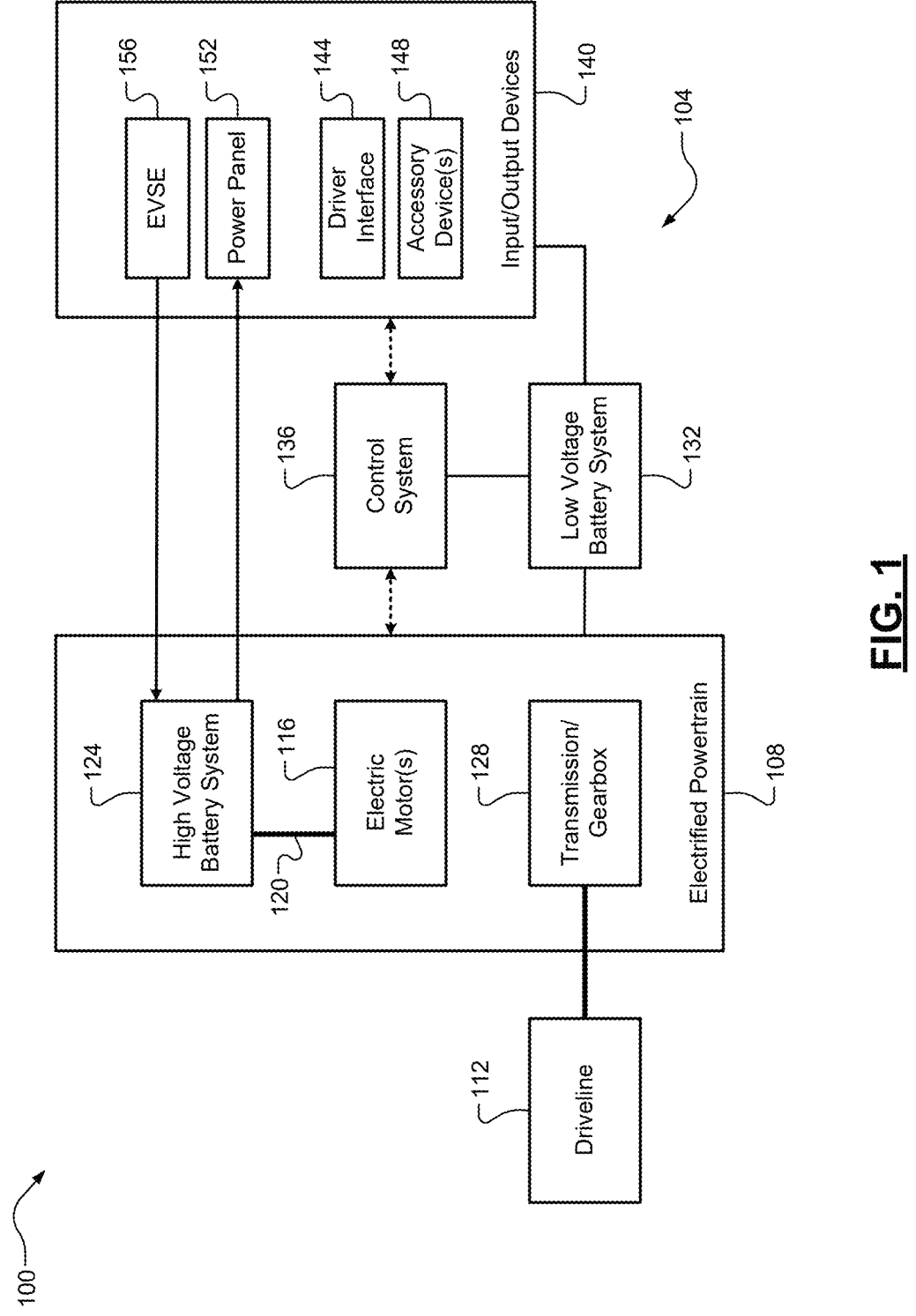
FIG. 1 is a functional block diagram of a vehicle having an example hardwire wake-up line monitoring and power saving system according to the principles of the present application.

Referring now to FIG. 1, a functional block diagram of a vehicle 100 having an example hardwire wake-up line monitoring and power saving system 104 according to the principles of the present application is illustrated. In one exemplary implementation, the vehicle 100 is an electrified vehicle and will hereinafter be referred to as "electrified vehicle 100," but it will be appreciated that the techniques of the present application could be applicable to other vehicles (e.g., conventional engine-only vehicles). The electrified vehicle 100 comprises an electrified powertrain 108 configured to generate and transfer drive torque to a driveline 112 for propulsion. As shown, the electrified powertrain 108 includes one or more electric motors 116 (e.g., a three-phase electric traction motor) configured to generate drive torque using electrical energy provided by a high voltage bus 120 supported by a high voltage battery pack or system 124. The electrified powertrain 108 also includes a transmission or gearbox 128 configured to transfer the drive torque from the electric motor(s) 116 to the driveline 112 (axles/half-shafts, a differential, wheels, etc.). In some implementations, the electrified powertrain 108 could include one or more additional power generation systems (not shown), such as an internal combustion engine and/or a fuel cell system. It will also be appreciated that the electrified powertrain 108 could include other non-illustrated components, such as a DC-DC converter for supporting a low voltage (12V) battery system 132 of the electrified vehicle 100.

The electrified vehicle 100 is controlled by a control system 136 comprising a plurality of controllers as shown in other figures and discussed in greater detail below. The control system 136 is primarily configured to control the electrified powertrain 108 to generate an amount of drive torque to satisfy a driver torque request received by a user/driver of the electrified vehicle 100. The driver torque request is provided by the driver via one of a plurality of input/output devices 140 (e.g., a driver interface 144, such as an accelerator pedal). The plurality of input/output devices 140 could further include any other sensors, actuators, or other sub-systems of the electrified vehicle 100. Three other specific sub-systems illustrated are accessory device(s) 148 (lights, displays, speakers, fans, pumps, etc.), a power panel 152, which is configured to offload electrical energy (e.g., current) from the electrified vehicle 100 (e.g., the high voltage battery system 124) to another device, and electrified vehicle supply equipment (EVSE) 156 (a vehicle charge port, a charging plug/cable, an external charging station, etc.). It will be appreciated that the electrified vehicle 100 could also include other relevant components that are not specifically illustrated, such as electrical parameters sensors (current, voltage, etc.) and the like.

Figure 2:
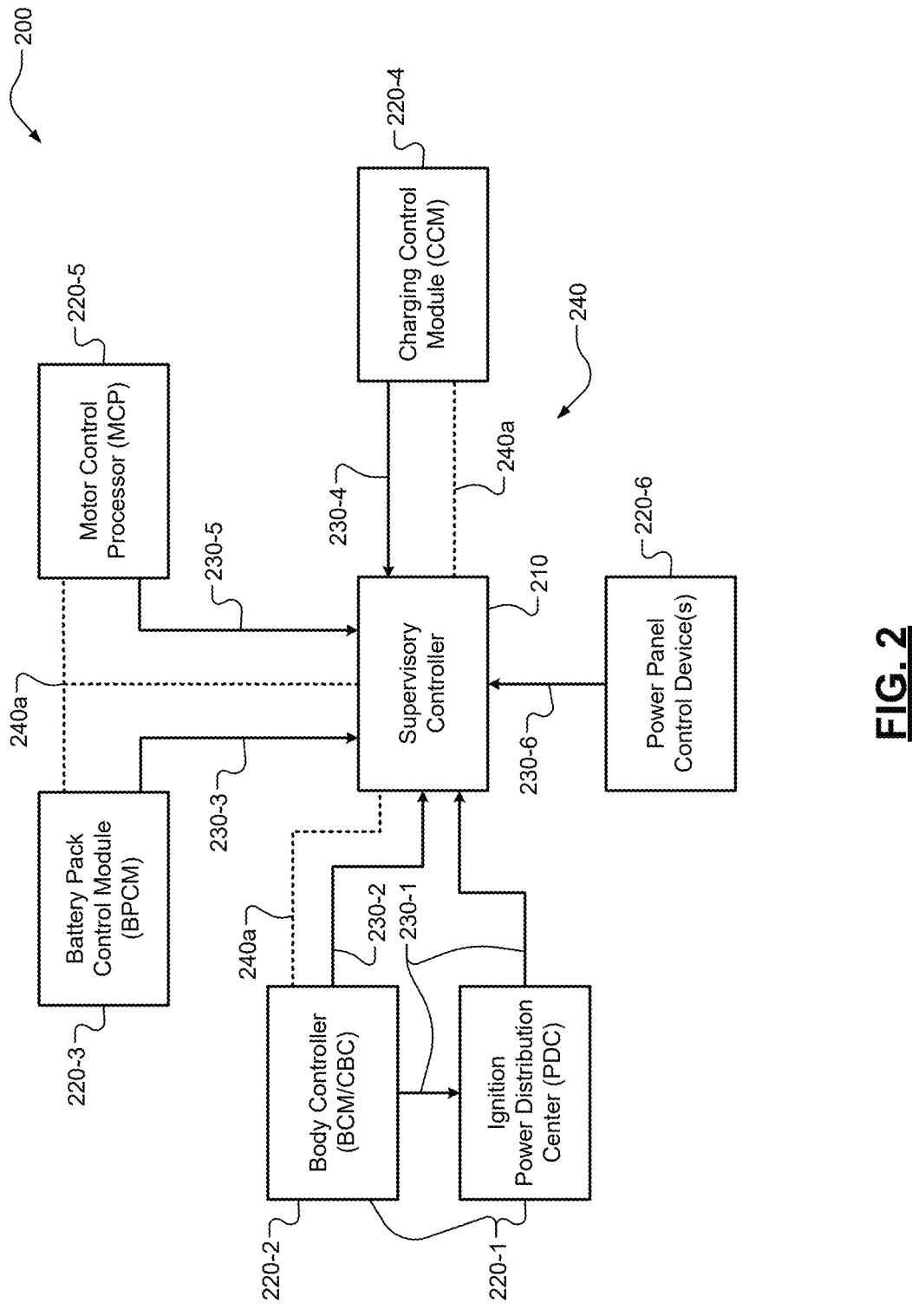
FIG. 2 is a functional block diagram of an example system architecture for the hardwire wake-up line monitoring and power saving system of FIG. 1 according to the principles of the present application.

Referring now to FIG. 2 and with continued reference to FIG. 1, a functional block diagram of an example system architecture 200 for the control system 136 is illustrated. It will be appreciated that this system architecture 200 is merely one example architecture and that the electrified vehicle 100 could include any suitable architecture (e.g., only one or more of the hereinafter described secondary controllers) depending on the network architecture, controller capabilities and board inputs, and functional needs. As shown, the control system 136 comprises a supervisory controller 210 and a plurality of secondary controllers 220-1 . . . 220-6 (collectively, "secondary controllers 220"). Each of the secondary controllers 220 is connected to the supervisory controller 210 via a respective hardwire wake-up line 230-1 . . . 230-6 (collectively, "hardwire wake-up lines 230"). While not specifically shown, each of the hardwire wake-up lines 230 could also be connected (e.g., via a switch, not shown) to a 12V power source, such as the low voltage battery system 132. The respective secondary controllers 220 then control these respective hardwire wake-up lines 230 to provide an active/high signal (also referred to herein as "a wake-up signal") to the supervisory controller 210. Some of the controllers 210, 220 could also be in communication via a CAN 240. For example, a CAN bus 240a (also referred to as an electrified powertrain, or ePT CAN bus 240a) connects the supervisory controller 210 to secondary controllers 220-2, 220-3, 220-4, and 220-5.

As previously mentioned, there could be malfunctions where one or more of the hardwire wake-up lines 230 is shorted to 12V and thus remains high/active and providing the wake-up signal to the supervisory controller 210. Examples of these malfunctions and the resulting malfunction scenarios will now be described in greater detail with respect to specific configurations of the various secondary controllers 220. In one exemplary implementation, secondary controller 220-2 is a body control module (BCM), which is configured to interact with the supervisory controller 210 via secondary controller 220-1, which is configured as a power distribution center (PDC). Specifically, the hardwire wake-up lines 230-1 for this example configuration could be three different ignition lines from the BCM 220-2 to the PDC 220-1 and then from the PDC 220-1 to the supervisory controller 210. The three ignition lines could be (1) an ignition run line, which provides input that the user has requested a start (cranking), the ignition being in a pre-start state (the ignition switch/button was just pressed), or the ignition being in a post-start state (ignition on and the propulsion system being active), (2) an ignition run/start line, which provides input that the user has requested the ignition in the pre-start state, and (3) an ignition run/ accessory line, which provides input that the user has requested the ignition to an accessory state. These specific hardwire wakeup lines 230 are used for a mechanism of redundancy in failure use cases when CAN communication is faulted or not established or as a faster method to avoid CAN delays for starting/waking up the supervisory controller 210.

One example of the failure use case for these hardwire wakeup lines 230-1 is as follows. The user turns the off the vehicle 100, but any of the applicable ignition hardwire lines 230-1 are malfunctioned (e.g., shorted to high) causing the supervisory controller 210 to stay awake and causing the low voltage (12V) battery system 132 to drain. Since the Ignition hardwire wakeup lines 230-1 are considered a valid source of wake-up, also to wake up and keep other controllers awake and CAN communication enabled in a few implementations, this failure increases the 12V drain as it keeps additional controllers awake with communication enabled on the specific buses. Per the techniques of the present application, when any of the above mentioned hardwire wake-up lines 230-1 are malfunctioned (e.g., shorted to high), the supervisory controller 210 arbitrates against other sources (e.g., use the ignition status available on the CAN 240) and keeps itself awake (in the low power mode) and lets other follower/dependent controllers to go to sleep. When a new valid wake-up occurs, the supervisory controller 210 arbitrates the reason and wakes up its associated buses and controllers to function normally.

In another exemplary implementation, secondary controller 220-2 is another body controller, i.e., not a BCM but instead a central body controller (CBC). The hardwire wake-up line 230-2 for this example configuration is for older or legacy network architectures (e.g., PowerNet® or Chrysler® Compact U.S. Wide, or CUSW) accommodating multiple wake-up reasons on their network architectures where the supervisory controller 210 does not need to wake-up on the CAN 240 or there are special reasons to have hardwire wake-up and network management (e.g., based on splitting of functionalities). One example of the failure use case for these hardwire wake-up line(s) 230-2 is as follows. This is a pulse-based wake-up line, where in some cases the supervisory controller 210 does not have the capability to wake up on the CAN 240 or with a real-time clock (RTC) due to hardware restrictions or even due to split in functions between two controllers, in this case the CBC 220-2, which has all the primary interfaces with the customer processes these functions and wakes the supervisory controller 210 by asserting the hardwire wake-up line(s) 230-2 for calibratable time (e.g., best guess of ~10 seconds) to inform the reason for the wake-up and need for functional enablement.

Once asserted, the supervisory controller 210 wakes up its follower components to perform the functionality. In this case, due to a malfunction (e.g., short to high) on the CBC output, the hardwire wake-up line 230-2 is always asserted. After a calibratable time, the supervisory controller 210 sets a diagnostic against the hardwire wake-up line 230-2, but the supervisory controller 210 cannot power down, it constantly resets, and it wakes up the other controllers that it manages. Per the techniques of the present application, once the supervisory controller 210 detects a fault against the hardwire wakeup line 230-2, it transitions to the low power mode and lets its associated buses and follower controllers to go to sleep during a power down. For any new valid wake-up (e.g., CAN wake-up is possible in some controllers; if not, it depends on other hardwire wake-up sources) the supervisory controller 210 can wake-up (e.g., transition from the low power mode to a normal mode) to perform at least limited functionality (such as a customer selection to charge now on infotainment or a mobile app, but the customer can go charge the vehicle by plugging in), and/or the customer can go to the dealership and get the hardwire wake-up line 220-2 fixed.

In another exemplary implementation, secondary controller 220-3 is a battery pack control module (BPCM) configured to control the high voltage battery system 124 of the vehicle 100. The hardwire wake-up line 230-3 can be based on a functional split where the BPCM 220-3 can perform monitor the high voltage battery system 124 itself, such as arbitration of timers for conditioning, information sharing about the status of the battery system 124 in a sleep state, and thermal runaway detection of the battery system 124 in a sleep state. One example of the failure use case for the hardwire wake-up line 230-3 is as follows. The BPCM 220-3 detects a reason to wake up the supervisory controller 210 and, in response, the BPCM 220-3 does not de-assert the hardwire wake-up line 230-3 once the supervisory controller 210 takes over the function, and the BCPM 220-3 continues to assert the hardwire wake-up line 230-3 due to a malfunction (e.g., an output circuit short to 12V battery high). Even after the supervisory controller 210 completes the function, the BPCM 220-3 will keep the hardwire wake-up line 230-3 asserted, causing the supervisory controller 210 to stay awake and keep the other controllers awake due to this fault.

In some implementations, the supervisory controller 210 can try to go to sleep (e.g., force a sleep), but the supervisory controller 210 would then reset itself and go back to the wake-up sequence and wakeup other controllers on the connected buses causing a failure loop and constantly draining the low voltage (12V) battery system 132. Further, this could cause flickering of accessory devices 148 (head lamps, radio ON/OFF, interior, cluster turning ON/OFF) as this wake-up also requires the customer to be informed of the event that had occurred. Per the techniques of the present application, when the supervisory controller 210 arbitrates the reason to power down due to an elapsed time or function or there is no reason from BPCM 220-3 and it does not de-assert the hardwire wake-up line 230-3 and continues to assert the hardwire wake-up line 230-3 (e.g., high due to output circuit short to 12V battery), the supervisory controller 210 will operate in the low power mode and let the other follower controllers go to sleep along with the associated CAN/LIN buses. When a new valid wake-up occurs, the supervisory controller 210 arbitrates the reason and wakes up its associated buses and controllers to function normally, thus solving the issues of staying awake or constant resets waking up the whole vehicle due to BPCM wakeups.

In another exemplary implementation, secondary controller 220-4 is a charging control module (CCM), such as an integrated dual charging module (IDCM) or on-board charging module (OBCM), configured to control the charging of the high voltage battery system 124 of the vehicle 100 via the EVSE 156. The hardwire wake-up line 230-4 from the CCM 220-4 is for EVSE events such as plug-in, plug-out, or any proximity detection, when the supervisory controller 210 is asleep. One example of the failure use case for the hardwire wake-up line 230-4 is as follows. The CCM 220-4 detects a wake-up reason, then the CCM 220-4 does not de-assert the hardwire wake-up line 230-4 once the supervisory controller 210 takes over the function, and the CCM 220-4 continues to assert the hardwire wake-up line 230-4 (e.g., high due to output circuit short to 12V battery). Even after the supervisory controller 210 completes the function, the CCM 220-4 will keep the hardwire wake-up line 220-4 asserted, causing the supervisory controller 210 to stay awake keep the other controllers awake due to this fault. In some implementations, the supervisory controller 210 can try to or force a sleep, but the supervisory controller 210 would then reset itself and go back to the wake-up sequence and wake-up other controllers on the connected buses causing a failure loop and constantly draining the low voltage (12V) battery system 132.

Further, this failure loop could again cause flickering of the accessory devices 148 (head lamps, radio ON/OFF, interior, cluster turning ON/OFF) as this wake-up also requires customer to be informed of the event that had occurred. In contrast to the above, according to the techniques of the present application, when the supervisory controller 210 arbitrates the reason to power down due to an elapsed CCM or charging/discharging function and the CCM 220-4 does not de-assert the hardwire wake-up line 230-4 and continues to assert the hardwire wake-up line 230-4 (e.g., high due to output circuit short to 12V battery), the supervisory controller 210 will operate in the low power mode and let the other follower controllers go to sleep and the associated CAN/LIN buses. When a new valid wake-up occurs, the supervisory controller 210 arbitrates the reason and wakes up its associated buses and controllers to function normally, thus solving the issues of staying awake or constant resets waking up the whole vehicle due to charging/discharging wakeups.

In another exemplary implementation, secondary controller 220-5 is a motor control processor (MCP) that controls the electric motor(s) 116. The hardwire wake-up line 230-5 from the MCP 220-5 can be used for a gate drive wake-up (e.g., back electromotive force based) that is used to inform the supervisory controller 210 that high voltage is present on the high voltage bus 120 or that the vehicle 100 is being flat towed for support to not damage the components. One example of the failure use case for the hardwire wake-up line 230-5 is as follows. The MCP 220-5 detects a reason to wake up the supervisory controller 210, then the MCP 220-5 does not de-assert the hardwire wake-up line 230-5 once the supervisory controller 210 takes over the function, and the MCP 220-5 continues to assert the hardwire wake-up line 230-5 (e.g., high due to output circuit short to 12V battery).

Even after the supervisory controller 210 completes the function, the MCP 220-5 will keep the hardwire wake-up line 230-5 asserted, causing the supervisory controller 210 to stay awake and keep the other controllers awake due to this fault. In some implementations, the supervisory controller 210 can try to or force a sleep, but the supervisory controller 210 would then reset itself and go back to the wake-up sequence and wake-up other controllers on the connected buses causing a failure loop and constantly draining the low voltage (12V) battery system 132. Per the techniques of the present application, when the supervisory controller 210 arbitrates the reason to power down due to an elapsed time or function or there is no reason from MCP 220-5 and it does not de-assert the hardwire wake-up line 230-5 and continues to assert the hardwire wake-up line 230-5 (e.g., high due to output circuit short to 12V battery), the supervisory controller 210 operates in the low power mode and lets the other follower controllers go to sleep and the associated CAN/LIN buses. When a new valid wake-up occurs, the supervisory controller 210 arbitrates the reason and wakes up its associated buses and controllers to function normally.

In yet another exemplary implementation, secondary controller 220-6 is a power panel control device (a controller, a switch/button, etc.) configured to control the power panel 152 of the vehicle 100. The supervisory controller 210 detects the power panel control device 220-6 being actuated (e.g., a switch being pressed), which is directly connected to the power panel 152. In response, the supervisory controller 210 wakes up all connected other buses (CAN, LIN, etc.) to enable the discharging event for the power panel 152. This mechanism could only used after discharging authentication is already performed and the supervisory controller 210 can support the discharge functionality. Even after the supervisory controller 210 completes the function, the power panel control device 220-6 stays high/active, causing the supervisory controller 210 to stay awake and keep the other controllers awake due to this fault.

In some implementations, the supervisory controller 210 can try to or force a sleep, but the supervisory controller 210 would then reset itself and go back to the wake-up sequence causing a failure loop. Per the techniques of the present application, the supervisory controller 210 detects a power panel control device 220-6 (e.g., a switch) and the corresponding direct connection or hardwire wake-up line 230-6 shorted to high based on the expiration of a discharging function and, based on the fault arbitration, the supervisory controller 210 will operate in the low power mode and let the other follower controllers go to sleep and the associated CAN buses. When a new valid wake-up occurs, the supervisory controller 210 arbitrates the reason and wakes up its associated buses and controllers to function normally. The customer can thereafter go and replace the switch or the circuit for reusing the switch-based interface functionalities for on-board power panel 152.

Figure 3:
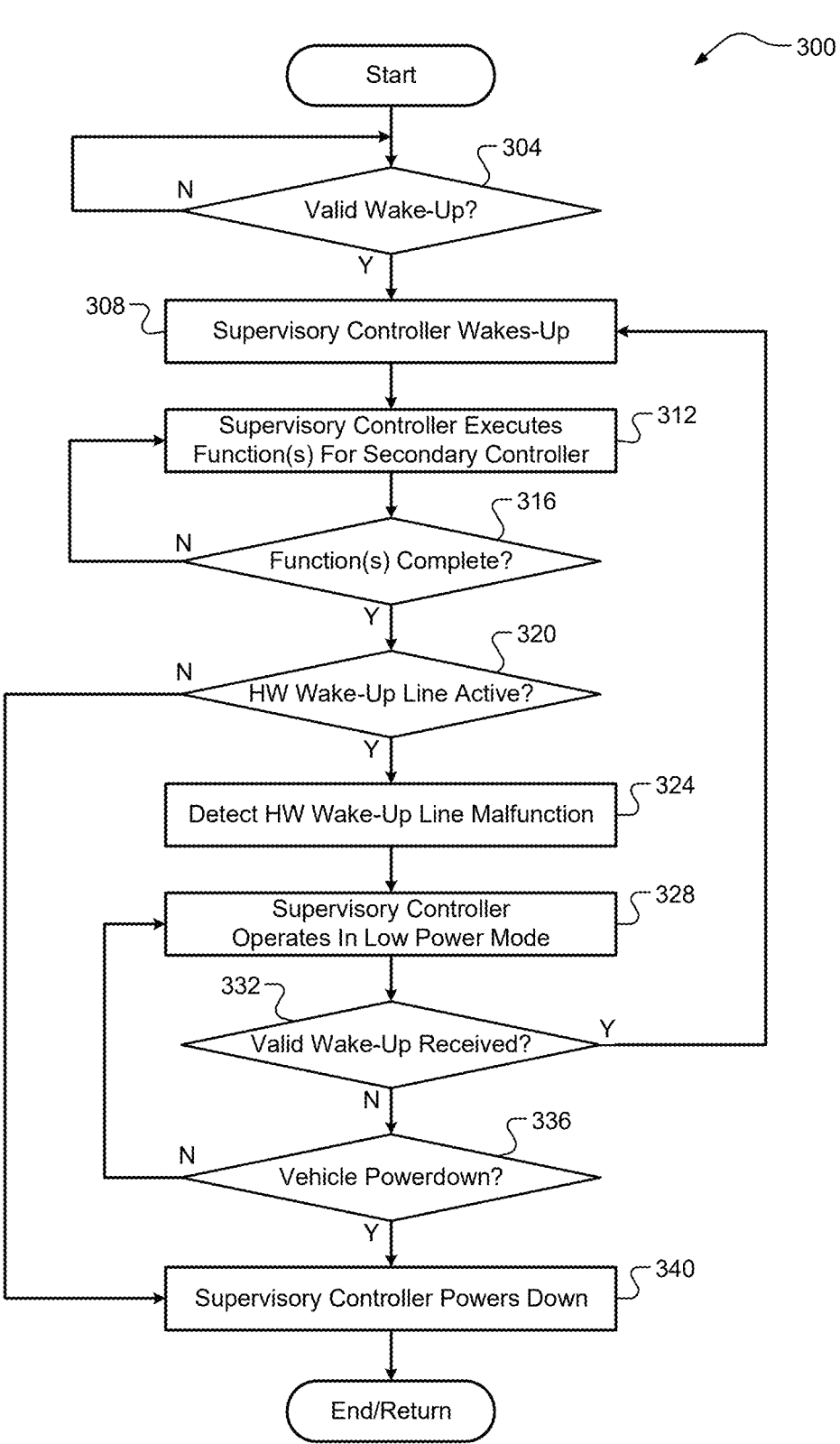
FIG. 3 is a flow diagram of a first example hardwire wake-up line monitoring and power saving method for a vehicle according to the principles of the present application.

Referring now to FIG. 3, a flow diagram of a first example hardwire wake-up line monitoring and power saving method 300 for a vehicle according to the principles of the present application is illustrated. While the vehicle 100 and some of its components are specifically referenced for illustrative/ descriptive purposes, it will be appreciated that the method 300 could be applicable to any suitable vehicle 100. The method 300 begins at 304. At 304, the supervisory controller 210 determines whether a valid wake-up has been received. This could be, for example only, a valid CAN-based or hardwire based wake-up provided by a secondary controller 220 as previously discussed herein. When false, the method 300 ends or returns to 304. When true, the method 300 proceeds to 308. At 308, the supervisory controller 210 wakes up. At 312, the supervisory controller 210 executes a set of functions corresponding to the wake-up request from the secondary controller 220, which could include a variety of different functions as previously discussed herein. At 316, the supervisory controller 210 determines whether its function(s) are complete. When false, the method 300 returns to 312. When true, the method 300 proceeds to 320.

At 320, the supervisory controller 210 determines whether the respective hardwire wake-up line(s) 230 remain high/active (e.g., shorted to 12V battery). When false, the method 300 proceeds to 340 where the supervisory controller 210 can power down or go to sleep and the method 300 ends. When true, the method 300 proceeds to 324. At 324, the supervisory controller 210 detects a malfunction of the respective hardwire wake-up line(s) 230 and, at 328, the supervisory controller 210 transitions to the low power mode where its outputs (CAN, LIN, etc.) are temporarily disabled and its follower controllers/modules 220 are allowed to power down or go to sleep. At 332, the supervisory controller 210, in the low power mode, determines whether a valid wake-up request is received. When true, the method 300 returns to 308. When false, the method 300 proceeds to 336. At 336, the supervisory controller 210 determines whether a power down of the entire vehicle 100 is requested. When false, the method 300 returns to 328. When true, the method 300 proceeds to 340 and thereafter the method 300 ends.

Figure 4:
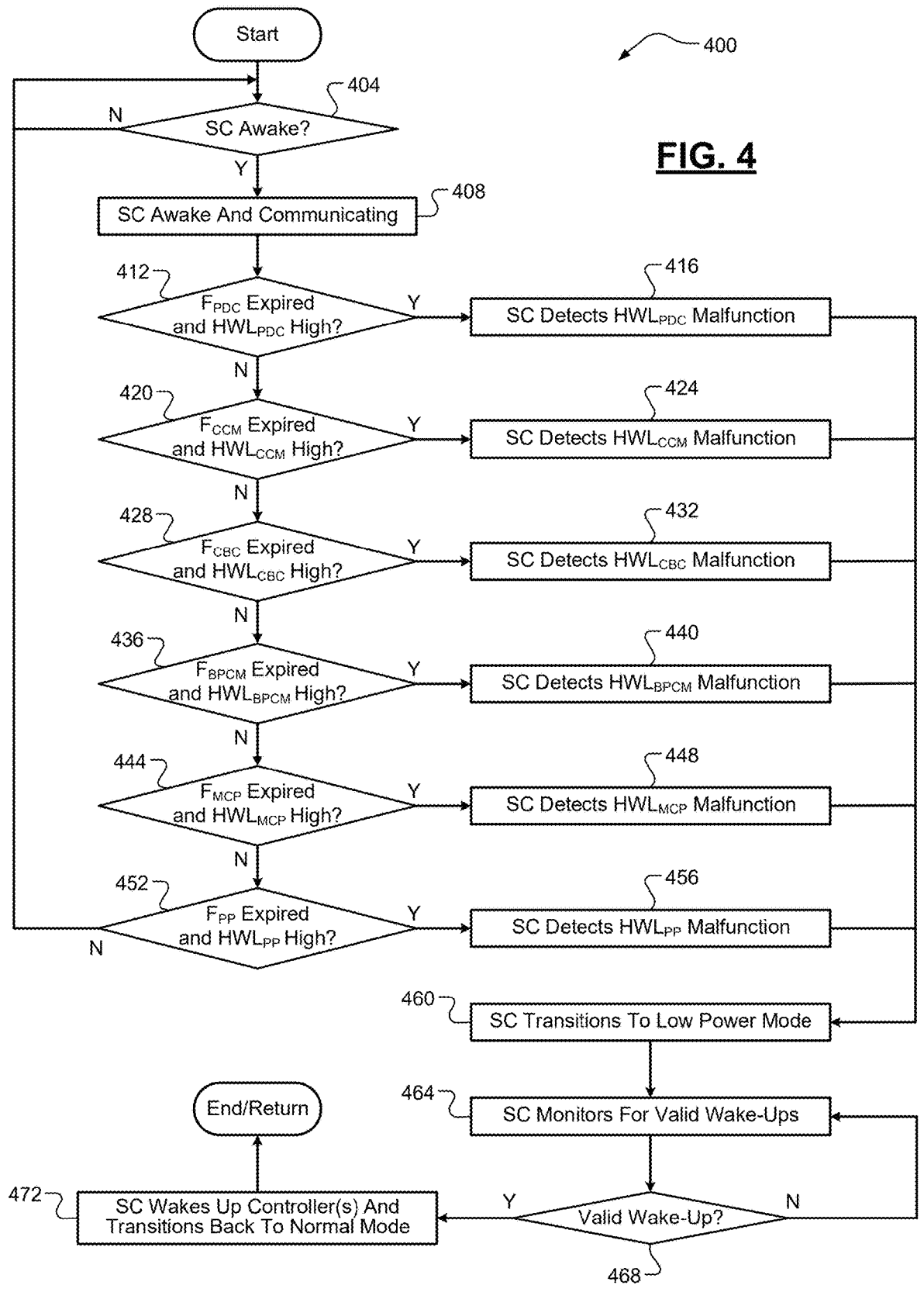
FIG. 4 is a flow diagram of a second example hardwire wake-up line monitoring and power saving method for a vehicle according to the principles of the present application.

Referring now to FIG. 4, a flow diagram of a second example hardwire wake-up line monitoring and power saving method 400 for a vehicle according to the principles of the present application. This method 400 is a more specific method than the more generic method 300 of FIG. 3 and more closely follows the specific embodiments of the secondary controllers 220 discussed in greater detail above. Again, while the electrified vehicle 100 and its components (e.g., FIG. 2) are specifically referenced for descriptive/ illustrative purposes, it will be appreciated that the method 400 could be applicable to another suitably configured electrified vehicle. The method 400 begins at 404 when the supervisory controller (SC) 210 is determined to be awake. When false, the method 400 ends or returns to 404. When true, the method 400 proceeds to 408. At 408, the supervisory controller 210 is awake and communicating. It will be appreciated that the following order of decisions 412-452 is one example implementation and that these decisions 412-452 could be made in a different priority or order. At 412, the supervisory controller 210 determines whether a set of functions (FPDC) associated with the BCM 220-2 and the PDC 220-1 have completed or expired and whether hardwire wake-up line 230-1 (HWLPDC) is active/high. When true, the method 400 proceeds to 416 where the supervisory controller 210 detects a malfunction of the hardwire wake-up line 230-1 and the method 400 proceeds to 460. When false, the method 400 proceeds to 420. At 420, the supervisory controller 210 determines whether a set of functions (FccM) associated with the CCM 220-4 have completed or expired and whether hardwire wake-up line 230-4 (HWLCCM) is active/high. When true, the method 400 proceeds to 424 where the supervisory controller 210 detects a malfunction of the hardwire wake-up line 230-4 and the method 400 proceeds to 460. When false, the method 400 proceeds to 428. At 428, the supervisory controller 210 determines whether a set of functions (FcBC) associated with the CBC 220-2 have completed or expired and whether hardwire wake-up line 230-2 (HWLCBC) is active/high. When true, the method 400 proceeds to 432 where the supervisory controller 210 detects a malfunction of the hardwire wake-up line 230-4 and the method 400 proceeds to 460. When false, the method 400 proceeds to 436.

At 436, the supervisory controller 210 determines whether a set of functions (FBPCM) associated with the BPCM 220-3 have completed or expired and whether hardwire wake-up line 230-3 (HWLBPCM) is active/high. When true, the method 400 proceeds to 440 where the supervisory controller 210 detects a malfunction of the hardwire wake-up line 230-3 and the method 400 proceeds to 460. When false, the method 400 proceeds to 444. At 444, the supervisory controller 210 determines whether a set of functions (FMCP) associated with the MCP 220-5 have completed or expired and whether hardwire wake-up line 230-5

(HWLMCP) is active/high. When true, the method 400 proceeds to 448 where the supervisory controller 210 detects a malfunction of the hardwire wake-up line 230-3 and the method 400 proceeds to 460. When false, the method 400 proceeds to 452. At 452, the supervisory controller 210 determines whether a set of functions (Fpp) associated with the power panel control device 220-6 have completed or expired and whether hardware wake-up line 230-6 (HWLPP) is active/high. When true, the method 400 proceeds to 456 where the supervisory controller 210 detects a malfunction of the hardwire wake-up line 230-6 and the method 400 proceeds to 460. When false, the method 400 ends or returns to 404. At 460, the supervisory controller 210 transitions to the low power mode where it temporarily disables its outputs (CAN, LIN, etc.), allowed other/follower modules (e.g., secondary controllers 220) to go to sleep, and remains awake only listening for valid wake-ups at 464. When a valid wake-up has not been received at 468, the method 400 returns to 464. When a valid wake-up has been received during the low power mode, the method 400 proceeds to 472. At 472, the supervisory controller 210 transitions back to a normal mode where relevant follower/secondary controllers 220 are woken up and communication via other channels (CAN, LIN, etc.) is resumed. The method 400 then ends or returns to 404 for another cycle.

It will be appreciated that the terms "controller," "control unit," "control module," and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A hardwire wake-up line monitoring and power saving system for a vehicle, the system comprising:
  a supervisory controller of the vehicle; and
  a hardwire wake-up line connected to the supervisory controller and controlled by a secondary controller of the vehicle to selectively provide a wake-up signal to wake-up the supervisory controller, wherein the hardwire wake-up line is a power supply line and not a communication line,
  wherein the supervisory controller is configured to:
    wake-up in response to the wake-up signal;
    in response to waking up, execute a set of functions for the secondary controller;
    after completion of the set of functions, detect a malfunction of the hardwire wake-up line when the hardwire wake-up line is still providing the wake-up signal, wherein the malfunction of the hardwire wake-up line is caused by a short of the hardwire wake-up line; and in response to detecting the malfunction of the hardwire wake-up line, transition to a low power mode where outputs of the supervisory controller are temporarily disabled to save power and the supervisory controller continues to monitor for a valid wake-up request.

2. The system of claim 1, wherein the supervisory controller is configured to transition from the low power mode to a normal mode in response to receiving the valid wake-up request, and wherein the valid wake-up request is a wake-up signal received by the supervisory controller (i) via another hardwire wake-up line controlled by another secondary controller of the vehicle or (ii) via a controller area network (CAN) bus of the vehicle.

3. The system of claim 1, wherein the outputs of the supervisory controller that are temporarily disabled during the low power mode include outputs via controller area network (CAN) buses and local interconnect network (LIN) buses of the vehicle.

4. The system of claim 1, wherein the vehicle is an electrified vehicle comprising a 12 Volt (12V) battery system, and wherein the short of the hardwire wake-up line is to the 12V battery system.

5. The system of claim 4, wherein the secondary controller is a body control module (BCM) and the hardwire wake-up line is an ignition run line.

6. The system of claim 4, wherein the secondary controller is a charging control module (CCM) and the hardwire wake-up line is a plug-in status line.

7. The system of claim 4, wherein the secondary controller is a central body controller (CBC) and the hardwire wake-up line is a pulse-based wake-up line, and wherein the supervisory controller does not have the capability to wake-up on a controller area network (CAN) or a real-time clock (RTC).

8. The system of claim 4, wherein the secondary controller is a battery pack control module (BPCM) for a high voltage battery system of the electrified vehicle and the supervisory controller does not participate in a set of condition or monitoring functions performed by the BPCM on the high voltage battery system.

9. The system of claim 4, wherein the secondary controller is a motor control processor (MCP) for an electric motor of the electrified vehicle and the hardwire wakeup line is configured as a back electromotive force (EMF) based gate drive wakeup to inform the supervisory controller that high voltage is present on a high voltage bus or that the electrified vehicle is being flat towed.

10. The system of claim 4, wherein the secondary controller is a power panel control device for user control of a power generation mode where electrical energy is offloaded from the electrified vehicle and the hardwire wakeup line is directly connected to the power panel control device.

11. A hardwire wake-up line monitoring and power saving method for a vehicle, the method comprising:
  providing, by a secondary controller of the vehicle, a wake-up signal to a supervisory controller of the vehicle via a hardwire wake-up line connected therebetween, wherein the hardwire wake-up line is a power supply line and not a communication line;
  waking up, by the supervisory controller, in response to receiving the wake-up signal via the hardwire wake-up line;
  executing, by the supervisory controller, a set of functions for the secondary controller associated with the wake-up signal;
  detecting, by the supervisory controller, a malfunction of the hardwire wake-up line when the set of functions are completed or expired and the hardwire wake-up line is still providing the wake-up signal, wherein the malfunction of the hardwire wake-up line is caused by a short of the hardwire wake-up line; and in response to detecting the malfunction of the hardwire wake-up line, transitioning, by the supervisory controller, to a low power mode where outputs of the supervisory controller are temporarily disabled to save power and the supervisory controller continues to monitor for a valid wake-up request.

12. The method of claim 11, wherein the supervisory controller is configured to transition from the low power mode to a normal mode in response to receiving the valid wake-up request, and wherein the valid wake-up request is a wake-up signal received by the supervisory controller (i) via another hardwire wake-up line controlled by another secondary controller of the vehicle or (ii) via a controller area network (CAN) bus of the vehicle.

13. The method of claim 11, wherein the outputs of the supervisory controller that are temporarily disabled during the low power mode include outputs via controller area network (CAN) buses and local interconnect network (LIN) buses of the vehicle.

14. The method of claim 11, wherein the vehicle is an electrified vehicle comprising a 12 Volt (12V) battery system, and wherein the short of the hardwire wake-up line is to the 12V battery system.

15. The method of claim 14, wherein the secondary controller is a body control module (BCM) and the hardwire wake-up line is an ignition run line.

16. The method of claim 14, wherein the secondary controller is a charging control module (CCM) and the hardwire wake-up line is a plug-in status line.

17. The method of claim 14, wherein the secondary controller is a central body controller (CBC) and the hardwire wake-up line is a pulse-based wake-up line, and wherein the supervisory controller does not have the capability to wake-up on a controller area network (CAN) or a real-time clock (RTC).

18. The method of claim 14, wherein the secondary controller is a battery pack control module (BPCM) for a high voltage battery system of the electrified vehicle and the supervisory controller does not participate in a set of condition or monitoring functions performed by the BPCM on the high voltage battery system.

19. The method of claim 14, wherein the secondary controller is a motor control processor (MCP) for an electric motor of the electrified vehicle and the hardwire wakeup line is configured as a back electromotive force (EMF) based gate drive wakeup to inform the supervisory controller that high voltage is present on a high voltage bus or that the electrified vehicle is being flat towed.

20. The method of claim 14, wherein the secondary controller is a power panel control device for user control of a power generation mode where electrical energy is off-loaded from the electrified vehicle and the hardwire wakeup line is directly connected to the power panel control device.

* * * * *